United States Patent [19]

Lawson

[11] 3,716,025
[45] Feb. 13, 1973

[54] VERTICAL TANK SYSTEM FOR FISH REARING

[76] Inventor: Buford Bernard Lawson, 2994 Woodvale Drive, Memphis, Tenn.

[22] Filed: Nov. 30, 1970

[21] Appl. No.: 54,832

[52] U.S. Cl. ............................................. 119/3
[51] Int. Cl. ........................................... A01k 63/00
[58] Field of Search .................................. 119/3, 5

[56] References Cited

UNITED STATES PATENTS

| | | | |
|---|---|---|---|
| 880,783 | 3/1908 | Erlwein et al. | 119/5 |
| 881,488 | 3/1908 | Rochow | 119/5 |
| 2,944,513 | 7/1960 | Keely | 119/3 |
| 3,116,712 | 1/1964 | Ogden et al. | 119/3 |

*Primary Examiner*—Hugh R. Chamblee

[57] ABSTRACT

A self-contained system for rearing and harvesting fish commercially, e.g., catfish or the like. The system includes a vertically disposed cylindrical tank having a roof positioned over the open upper end thereof. A cone-shaped bottom member of the tank collects toxic matter and decomposed food and provides s sump which is communicated with a closable dump valve. Also included are primary and secondary aeration units which jointly provide multilevel aeration from a source of air. An automatic portion feeder is included which is connected with an outside water source and has discharge structure communicated with the interior of the tank for conveying and discharging optimum portions of feed into the tank. The temperature of the water within the tank is thermostatically controlled within an optimum temperature range by structure provided and adapted for this purpose. A remote control panel is included which is electrically connected to certain disclosed structure to conveniently operate the totally self-contained system. Also included is a circular grid which is adapted to be raised to a discharge outlet that communicates with a loading chute. Raising the grid is effective to urge the fish through the discharge outlet hence the loading chute for loading the harvested fish onto a suitable conveyance.

7 Claims, 1 Drawing Figure

PATENTED FEB 13 1973 3,716,025
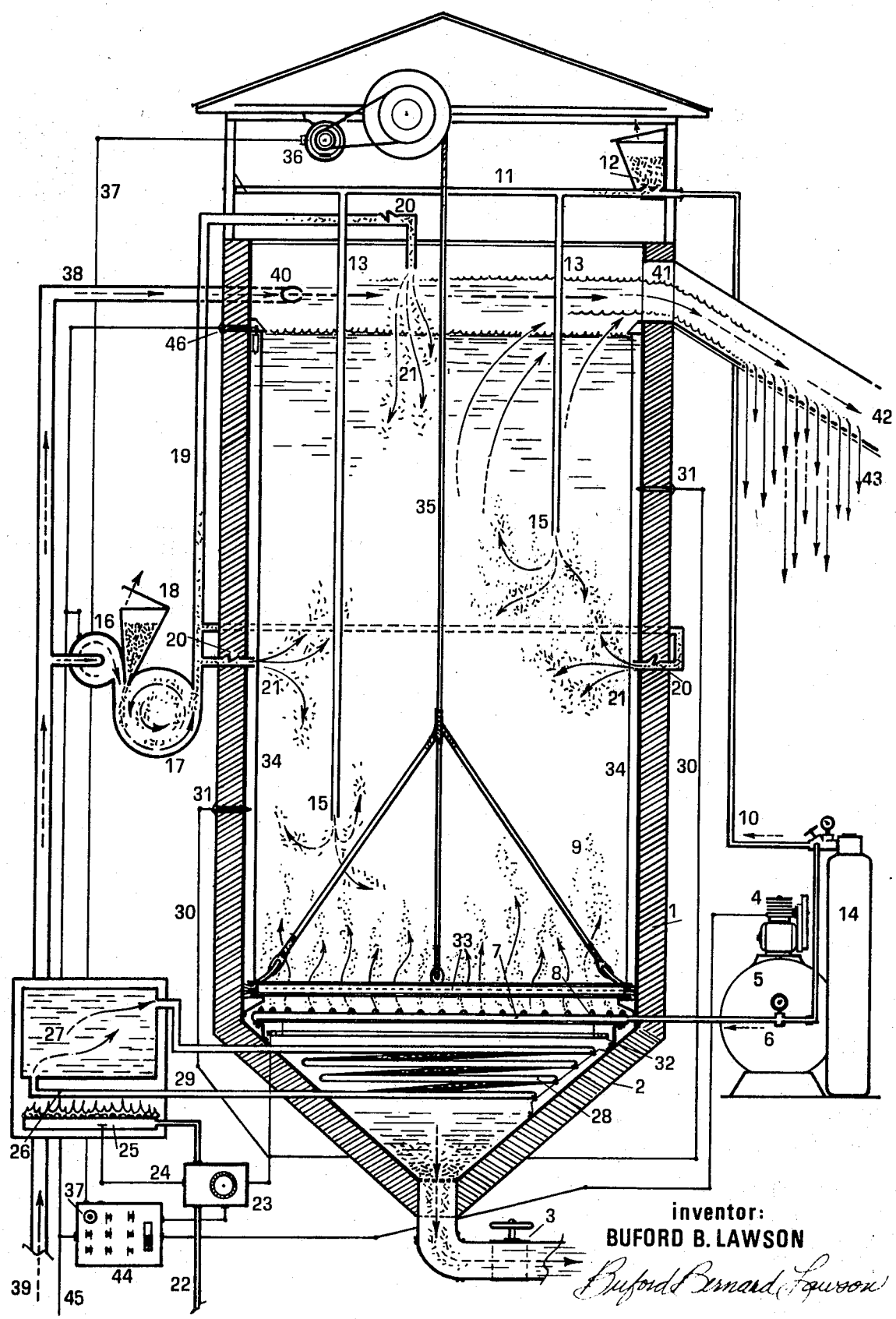
inventor:
BUFORD B. LAWSON
Buford Bernard Lawson

VERTICAL TANK SYSTEM FOR FISH REARING

This invention relates primarily to the rearing of fish for commercial purposes (specifically all kinds of catfish) in an automatically controlled environment using a minimum amount of land and water.

The vertical tank system is designed to increase catfish harvest cycles from one to two yearly with the use of aeration, water temperature control, disease prevention, and scientific feeding to reduce the growing time.

Since in normal fish farming the cost of labor and handling loss is high, a more profitable harvest can be achieved using automated equipment. Using this invention it is possible for two people to operate a small vertical tank farm equal to a large acreage pond type farm. More specific objectives:

1. To rear large quantities of fish in a vertical tank using a minimum amount of water for the growing cycle.
2. To maintain water temperature at 70° to 85° using a thermostatically controlled water heater to circulate hot water through a coil located in an isolated lower portion of the tank and create ideal fish feeding conditions summer or winter.
3. To maintain a high level of oxygen in the tank water at all depths by aeration.
4. To automatically portion feed at all levels in deep highly populated water.
5. To maintain a clean tank by draining off toxic matter and decomposed food.
6. To harvest large quantities of fish mechanically in a short period of time with minimum labor and damage.
7. A system that one or two persons can operate easily.
8. A centrally located control panel plus backup system and auxiliary power supply for emergencies.

The vertical water tank as shown in the drawing 1 may be constructed of insulated steel or reinforced concrete to size desired. Elevation of the tank should be enough to allow for a cone shaped sump 2 and drainage pipe with dump valve 3. By opening the valve 3 waste can be discharged to keep the water reasonably free of contamination.

To aerate and maintain oxygen saturation an air compressor 4 and storage tank 5 with demand valve 6 provides a steady airflow into the aeration coil 7 and out jets 8 to oxygenate the water 9. As a secondary aeration system, air forced thru line 10 into distributor line 11 of top feeder system siphons daily feed portions from hopper 12 forcing it under pressure thru lines 13 and out valves 15 at different levels for depth feeding and aeration. Extra oxygen supply to be used in the case that the main system fails 14.

The primary feeding unit operates by water pressure supplied by electric pump 16 into chamber 17 siphons portioned feed from hopper 18 into lines 19 thru valves 20 and distributor head 21 distributing food to all parts of the tank.

To create an ideal environment for catfish feeding the water must stay between 70° and 85° F. at all times. This is accomplished by heating water in coil 26 and storage reservoir 27 circulated thru coil 28 and line 29 to bring water temperature up and maintain it at a proper level — circulating it back to coil 26 to be reheated. The thermostat control 23 and pilot 24 are connected by lines 30 to elements 31 and 32, and propane gas 22 to supply heating unit 25.

At harvest time the lift grid 33 on four tracks attached to tank walls 34 is slowly raised by means of nylon cable 35 after start button 37 has motor and winch 36 in motion, then switches to outside water source 39, activates and pumps water thru line 38 raising water level 40 and forces it in a circular motion around the tank wall so the water and fish as they come up are gradually forced out gate 41 down chute 42 into tank truck, the water gradually leaving chute thru bottom sieve 43 before reaching truck, fish continue by force of gravity into truck.

The whole system is operated from a central control panel 44 which also contains a water level control 46, plus a checking and warning system if oxygen level or temperature drops. If outside electrical power source 45 fails fish can only live 15 to 20 minutes, therefore, a gas operated auxiliary power generator is necessary for emergency use.

What is claimed:

1. A vertical tank system for rearing cat fish commercially consisting of:
   a. a round open-top tank having a roof positioned thereon, a cone shaped bottom member providing a sump and discharge means closable by a dump valve,
   b. a primary aeration unit installed within a bottom portion of said tank and connected by pipe means extending through a wall portion of the tank to a source of air under pressure,
   c. a secondary multilevel aeration and feeder unit within said tank and connected with said source of air,
   d. an automatic portion feeder connected to an outside water source having discharge means communicating with the interior of said tank,
   e. a thermostatically controlled gas operated water heater positioned near the tank having coils extending within a bottom portion of the tank, to maintain a desired constant temperature in said tank,
   f. an electrically operated circular grid lift positioned within the tank near the bottom thereof and adapted to be raised to a discharge outlet means provided in the tank and a loading chute communicating with said discharge outlet means for harvesting fish,
   g. and a remote control panel connected with an electrical circuit means to operate the primary and secondary aeration units, the portion feeder, water heater and grid lift.

2. A vertical tank system for rearing cat fish as defined in claim one wherein said primary automatic feeder uses an electric water pump connected to a circular chamber to siphon pellet food from storage hopper through check valve, then forces it under pressure through said pipe means past the check valves into said tank at different levels.

3. A vertical tank system for rearing cat fish as defined in claim one wherein said secondary top attached multilevel aeration and feeder unit using said outside source of compressed air siphons feed from hopper through check valves and sends it to various levels in said tank by means of flexible hoses.

4. A vertical tank system as defined in claim one wherein said constant demand air compressor (outside source of air) connected by said pipe means through a wall portion of said tank to a circular bottom mounted aeration distributor with sieve type oxygenator valves is used to supply and maintain proper oxygen level in water of said tank.

5. A vertical tank system as defined in claim 1 wherein said gas operated, thermostatically controlled heater supplies hot water to said circular distributor coil, bottom mounted, in said tank to maintain a constant 70° to 80° temperature ideal for rearing catfish. Said thermostats are mounted above said distributor coil and said tank walls as a means of reading average temperature in depth of said tank.

6. A vertical tank system as defined in claim 1 wherein said circular grid is suspended from said roof by means of a nylon cable connected to a winch operated by an electric motor and guided by tracks attached vertically to said tank walls. When in operation an automatic switch starts the pump of said outside water source forcing water into the top of said tank through said pipe means set at 45° to a center line creating a circular movement of water around said tank walls. As the level of water rises, fish are forced out said discharge outlet in said tank upper walls and down said attached chute from which the excess water is drained through sieve bottom. The fish will be carried on into a suitable conveyance for transporting by force of gravity. Said grid lets the original volume of water stay inside said tank while slowly floating the fish in said tank, up, out said discharge outlet and down said chute.

7. A vertical tank system as defined in claim 1 wherein said remote control system intergrates the operation of all said units (primary and secondary aeration units, the portion feeder, water heater and grid lift) by said electrical circuit means into said central panel to insure an easy, safe and constant operation.

* * * * *